Patented Mar. 11, 1947

2,417,230

UNITED STATES PATENT OFFICE 2,417,230

PRODUCTION OF TARTARIC ACID

William Edward Barch, Freeport, N. Y., assignor to Standard Brands Incorporated, New York, N. Y., a corporation of Delaware No Drawing. Application October 12, 1943, Serial No. 506,010

5 Claims. (Cl. 260—536)

The invention relates to a process for the production of tartaric acid, and more particularly to the preparation thereof through oxidation of 5-keto gluconic acid. It includes correlated improvements and discoveries whereby such preparation is enhanced.

An object of the invention is to provide a procedure in accordance with which d-tartaric acid may be produced in substantially pure form.

Another object of the invention is to provide a process wherein d-tartaric acid is produced with substantial absence of formation of other forms of tartaric acid.

A further object of the invention is to provide for the formation of d-tartaric acid from 5-keto gluconic acid which gives increased yields and easily controlled reaction mixture.

A still further object of the invention is the provision of a process for preparation of d-tartaric acid that may be readily, economically and effectively practiced on a desired scale.

A more particular object of the invention is to provide for the production of d-tartaric acid through oxidation of 5-keto gluconic acid with nitric acid in the presence of a vanadium catalyst and under controlled conditions of temperature.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention d-tartaric acid may be produced substantially without formation of others of the tartaric acids by preparing a reaction mixture containing initially calcium 5-keto gluconate, oxalic acid in substantial amount whereby calcium is precipitated and which amount may be for optimum effect sufficient substantially to precipitate all of the calcium and a vanadium catalyst. After oxidation the d-tartaric acid thus produced may be separated by progressive evaporation and crystallization wherein oxalic acid separates out in crystalline form, with the exception of a small residual amount thereof. Thereafter, the d-tartaric acid may be obtained as the acid, or through reaction with the required quantity of a potassium compound, as potassium carbonate, it may be converted into cream of tartar, i. e., potassium hydrogen tartrate.

Additionally, the d-tartaric acid may be recovered through the addition of a calcium compound whereby it is converted into and precipitates out as calcium tartrate. The oxidation of the reaction mass to which oxalic acid has been initially added in order progressively to precipitate the calcium and release 5-keto gluconic acid for conversion into d-tartaric acid may be accomplished by means of nitric acid and under suitable temperature conditions, which may be from about 60° to about 100° C. When the oxidation has been effected the tartaric acid produced may be separated, as in the manner above outlined. More especially, it has been found that the amount of vanadium catalyst employed is critical, such that if it is more than 1 part in 1,000 an entirely different reaction results with formation of racemic acid and oxalic acid, and very little d-tartaric acid being produced. On the other hand, practically no catalytic effect is shown if the amount is less than 1 part in 50,000.

A satisfactory procedure for carrying out the oxidation resides in conducting the initial stage at room temperature, i. e., about 20° C., and an intermediate stage at about 60° C., with the final stage at about 100° C. The controlled temperature conditions may conform to the following: stirring at about 20° C., for a period of about one hour, then raising the temperature gradually to about 60° C. and maintaining it thereat for about an hour, and finally raising the temperature again gradually to about 100° C. and maintaining that temperature for a period of about one hour. The vanadium catalyst may be introduced as metallic vanadium, or as a suitable compound of vanadium, for example, oxides and vanadates, specifically, sodium orthovanadate.

As an illustrative embodiment of a procedure in accordance with which the production of d-tartaric acid may be conducted, the following description is presented.

In a suitable reaction vessel provided with a stirrer, thermometer, reflux condenser, and means for heating, as a water jacket, there may be introduced 100 parts calcium 5-keto gluconate, 28 parts oxalic acid, 100 parts concentrated nitric acid, specific gravity 1.42, and about 0.02 parts sodium orthovanadate. The reaction mass is stirred at room temperature, i. e., about 20° C., for a period of about one hour. Oxidation starts substantially immediately and continues slowly with little or no rise in temperature. After a period of about one hour the temperature of the reaction mass is gradually raised to about 60° C. Thereby the velocity of the reaction is increased and the temperature is carefully controlled to obviate a precipitate rise therein. At the end of about one hour at 60° C. the temperature is further raised to about 100° C. and maintained at such temperature for about one hour. Usually, the temperature of 100° C. is maintained until the atmosphere is substantially clear of red fumes and bubbling within the reaction mixture has practically ceased. Removal of precipitated calcium oxalate is then accomplished without cooling by filtering or other suitable means, and the calcium oxalate is washed. Upon cooling the filtrate there is a deposition of oxalic acid, and this may be increased by chilling or cooling to a lower temperature.

The d-tartaric acid contained in the liquid following separation therefrom of the deposited oxalic acid may be obtained by a further cooling, followed by evaporation, or the liquid may be evaporated to a desired extent with subsequent cooling to bring about separation therefrom of the d-tartaric acid in crystalline form. About 5 to 10% of the material remains as a non-crystalline syrupy residue, and several of these may be combined and subjected again to the oxidation procedure. There is thus obtained an increase in the yield of d-tartaric acid, and no further addition of vanadium need be made although some nitric acid should be introduced into the liquid. Oxidation of the syrupy residues leads to the formation of oxalic acid, d-tartaric acid, racemic acid and carbon dioxide, with the d-tartaric acid being present in markedly higher amounts than the racemic acid. Oxalic ac'd thus obtained in relatively pure condition, following cooling or evaporation and cooling of the oxidation liquid, may be applied for various purposes, such as a portion thereof being included initially in a subsequent reaction mixture. The following tabulation presents the percentage yields which resulted in the oxidation of three reaction mixes:

|  | 1 | 2 | 3 |
|---|---|---|---|
| Calcium oxalate | 31.4 | 31.4 | 31.4 |
| Crude oxalic acid | 41.6 | 39.5 | 48.9 |
| Crude tartaric acids | 43.6 | 47.9 | 46.3 |
| *Re-crystallized* | | | |
| Dextro tartaric acid | 39.0 | 38.4 | 37.7 |
| Racemic tartaric acid | 2.9 | 2.8 | 4.3 |
| | 41.9 | 41.2 | 42.0 |

On the basis of a 95% yield of calcium 5-keto gluconate from glucose, the average yield of tartaric acids is about 52% and this is about 65% of that which is theoretically possible.

An important feature of the procedure is that the oxidation should be maintained at a point which is slightly under a complete oxidation of the intermediate compounds formed. This is so since if the oxidation is insufficient the crystalline tartaric acid will be contaminated with the readily crystalline intermediate trihydroxy xylo glutaric acid. Moreover, an incomplete oxidation is indicated also by a higher percentage of non-crystalline syrup, and if it is decidedly incomplete there is a rapid darkening in color and evolution of carbon dioxide on evaporation. On the other hand, if the reaction mixture has been over-oxidized, there will be a residual amount of nitric acid present in the mixture even after heating for about one hour at a temperature of about 100° C. In either case the yield of d-tartaric acid is materially decreased.

Furthermore, the amount of nitric acid required to effect the desired oxidation is influenced by the temperature with higher temperatures requiring a larger amount of acid; by the amount of water present, it having been found that water decreases the velocity of oxidation and the amount of nitric acid required; and by the amount of air present inasmuch as atmospheric oxidation takes part in the reaction and occasions a decrease in the amount of nitric acid required. Additionally, it has been found that oxidation to the same extent may be brought about in accordance with the above outlined procedure when 20 parts of nitric acid were used with oxidation at 10 lbs. pressure and at room temperature, and also when 150 parts of nitric acid are used under conditions in which the temperature is raised immediately to about 100° C.

The procedure hereinbefore described for the production of d-tartaric acid is characterized by the following factors: control of the temperature of reaction, thereby reducing side reactions due to labile intermediates which are present only in the earlier stages so that a gradual raising of the temperature in the initial phases of the reaction followed by decidedly higher temperatures at a later stage results in a saving of time and an increase in yield; inclusion of oxalic acid initially in the reaction mixture leads to release of 5-keto gluconic acid which is readily oxidized to d-tartaric acid; control of the reaction so as to yield entirely the desired crystalline products without formation of undesired compounds, thus making isolation and purification both cheap and simple; control of the oxidation leading to crystallization of d-tartaric acid from the reaction mixture directly with a resultant residual syrup which may be further oxidized and an additional amount of tartaric acid formed; and oxidation may be effected under pressure utilizing either air or oxygen with an amount of nitric acid present which it is believed, acts in the nature of a catalyst or an oxygen carrier. The addition of oxalic acid initially, i. e., with the calcium 5-ketogluconate, leads, upon the introduction of nitric acid, to the formation of calcium oxalate which precipitates, and of ketogluconic acid, which consequently is formed in situ and immediately enters into the oxidation reaction. Such initial inclusion of oxalic acid occasions increased yields and an easily controlled reaction mixture.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, as a matter of language, might be said to fall therebetween.

Having described my invention, what I claim as new and desire to secure by Letters Patent is:

1. A process for production of d-tartaric acid, which comprises oxidizing a reaction mass containing initially calcium 5-keto gluconate, oxalic acid in substantial amount whereby calcium is precipitated and a vanadium catalyst by means of nitric acid, and separating d-tartaric acid thus produced.

2. A process for production of d-tartaric acid, which comprises oxidizing a reaction mass containing initially calcium 5-keto gluconate, oxalic acid in substantial amount whereby calcium is precipitated and a vanadium catalyst in an amount from about 1 part in 1,000 parts to 1 part in 50,000 parts by means of nitric acid, and separating d-tartaric acid thus produced.

3. A process for production of d-tartaric acid, which comprises oxidizing a reaction mass containing initially calcium 5-keto gluconate, oxalic acid in an amount sufficient substantially to precipitate the calcium and a vanadium catalyst by means of nitric acid under the following conditions: stirring at about 20° C. for about one hour; then raising the temperature to about 60° C. with maintenance thereof for about one hour, and finally raising the temperature to about 100° C. followed by maintenance thereat for about one hour, and separating d-tartaric acid thus produced.

4. A process for the production of d-tartaric acid, which comprises oxidizing a reaction mass containing 5-keto gluconic acid, initially added oxalic acid and a vanadium catalyst by means of nitric acid under the following conditions: stirring at about 20° C. for about one hour; then raising the temperature to about 60° C. with maintenance thereof for about one hour, and finally raising the temperature to about 100° C., cooling with resultant crystallization of oxalic acid, separating oxalic acid from the liquid, and recovering d-tartaric acid from separated liquid.

5. A process for production of d-tartaric acid, which comprises oxidizing a reaction mass containing initially calcium 5-keto gluconate, oxalic acid in substantial amount whereby calcium is precipitated, and a vanadium catalyst, by means of the conjoint oxidizing action of nitric acid and of oxygen under pressure, and separating d-tartaric acid thus produced.

WILLIAM EDWARD BARCH.

REFERENCES CITED

The following references are of record in the file of this patent:

UNITED STATES PATENTS

| Number | Name | Date |
| --- | --- | --- |
| 2,197,021 | Pasternack, et al. | Apr. 16, 1940 |
| 1,932,518 | Hale | Oct. 31, 1933 |
| 1,868,704 | Hale | July 26, 1932 |
| 2,217,836 | Dierichs | Oct. 15, 1940 |

OTHER REFERENCES

Barch, Journal Am. Chem. Soc., vol. 55, pp. 3653–3658 (1933). (Copy in Scientific Lib.)